E. A. SPERRY.
SUBMARINE NET AND METHOD OF LAYING THE SAME.
APPLICATION FILED MAY 31, 1917.
1,333,224.
Patented Mar. 9, 1920.
3 SHEETS—SHEET 1.
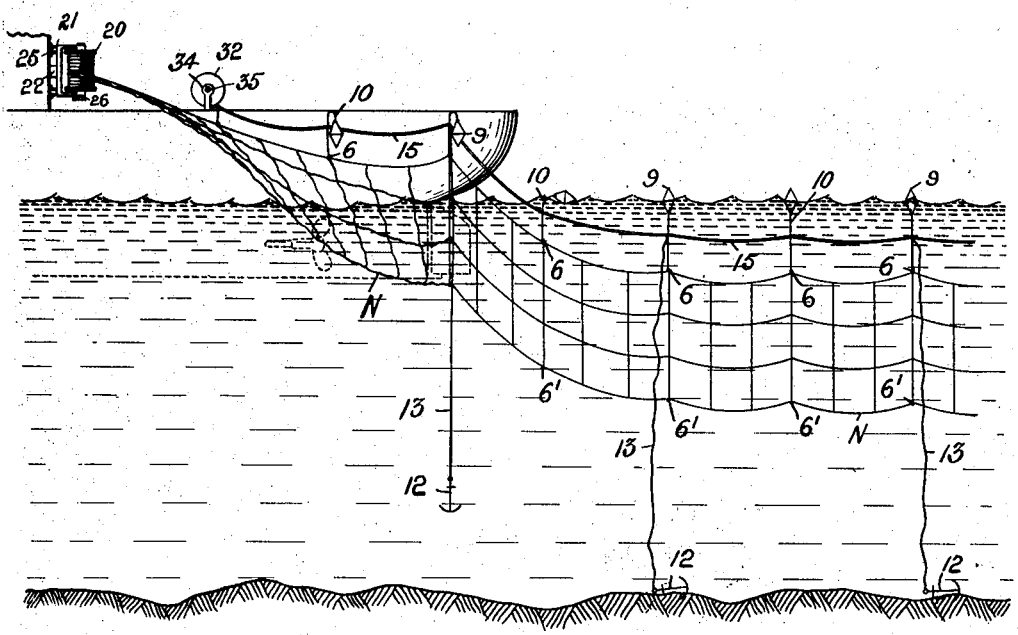
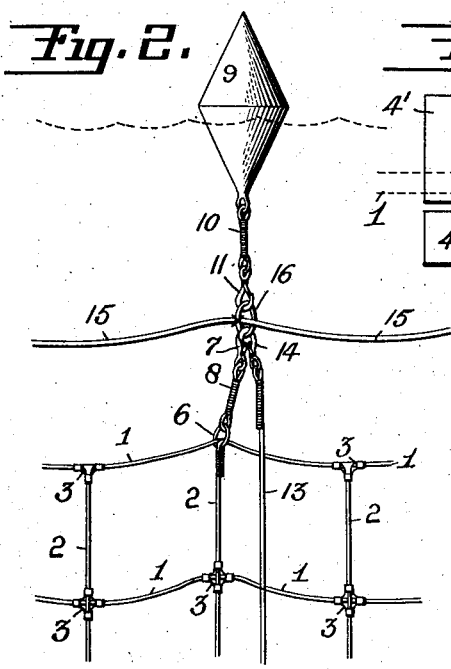
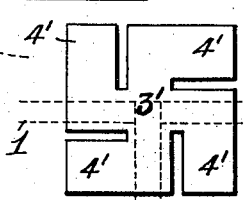
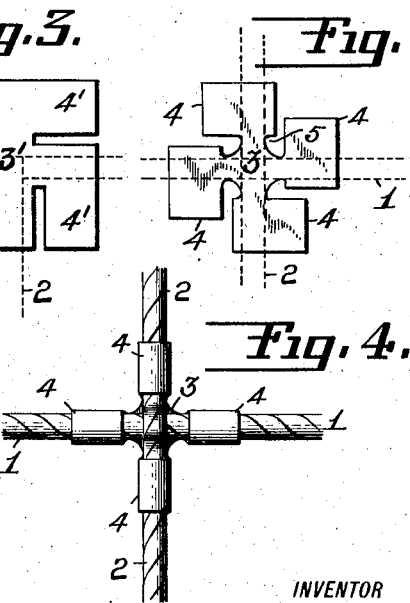
INVENTOR
Elmer A. Sperry.
BY
Herbert H. Thompson
ATTORNEY.

E. A. SPERRY.
SUBMARINE NET AND METHOD OF LAYING THE SAME.
APPLICATION FILED MAY 31, 1917.
1,333,224.
Patented Mar. 9, 1920.
3 SHEETS—SHEET 2.
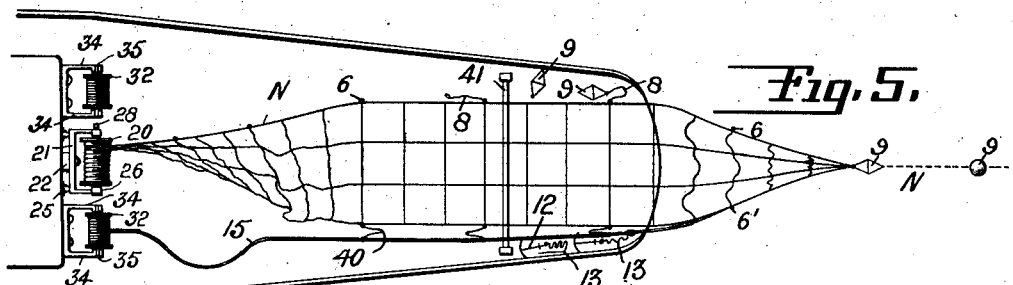
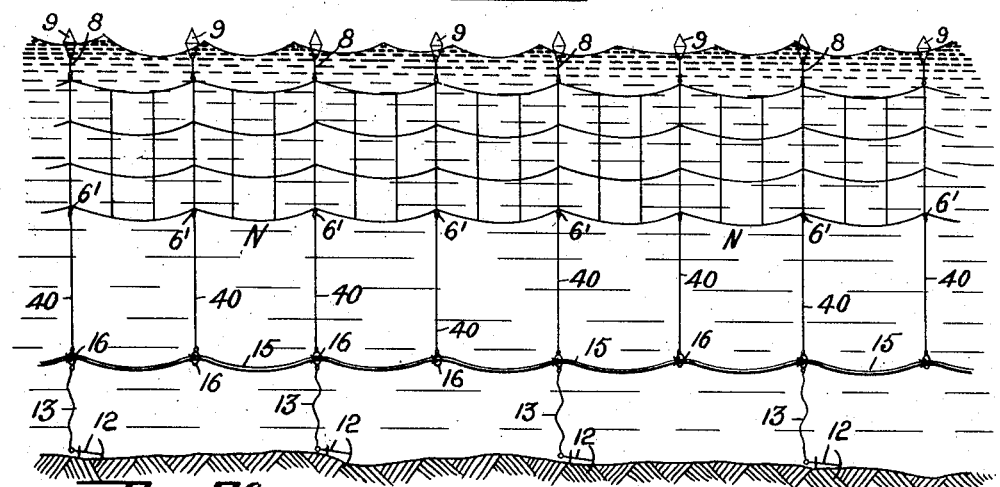
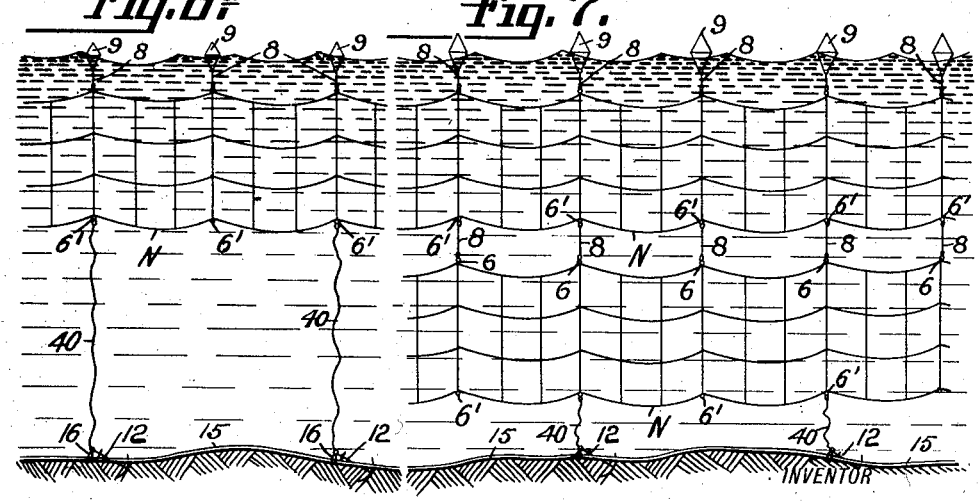
INVENTOR
Elmer A. Sperry.
BY
Herbert H. Thompson
ATTORNEY.

E. A. SPERRY.
SUBMARINE NET AND METHOD OF LAYING THE SAME.
APPLICATION FILED MAY 31, 1917.
1,333,224.
Patented Mar. 9, 1920.
3 SHEETS—SHEET 3.
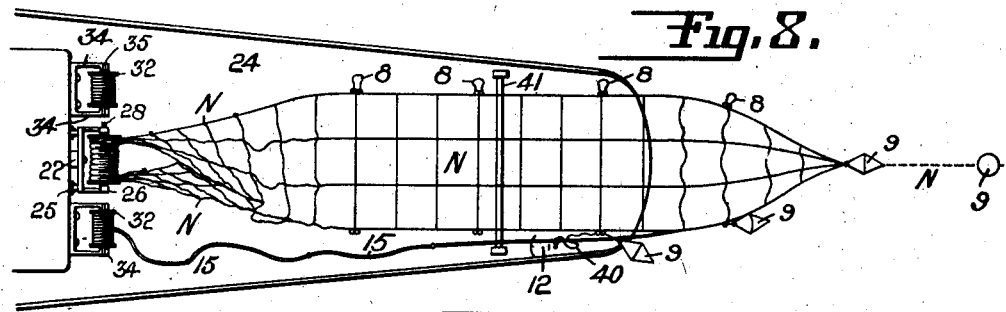
Fig. 8.
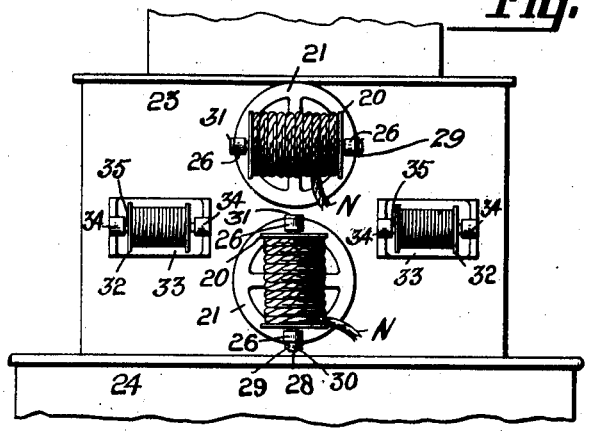
Fig. 9.
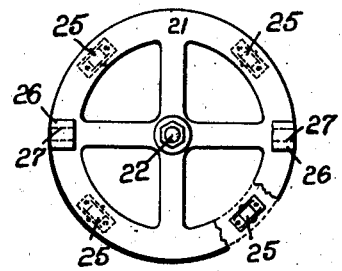
Fig. 10.
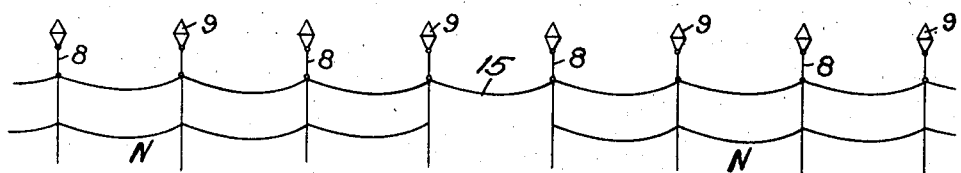
Fig. 11.
Fig. 12.
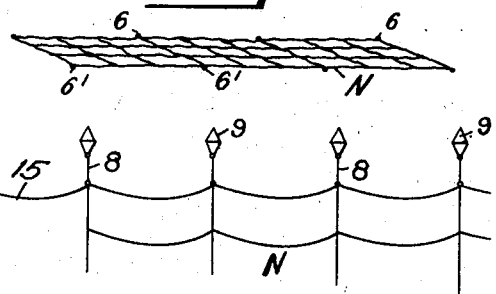
Fig. 13.
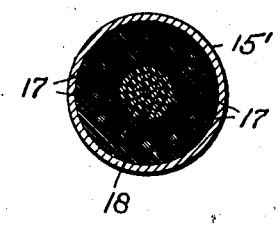
INVENTOR
Elmer A. Sperry.
BY
Herbert H. Thompson
ATTORNEY

UNITED STATES PATENT OFFICE.

ELMER A. SPERRY, OF BROOKLYN, NEW YORK.

SUBMARINE NET AND METHOD OF LAYING THE SAME.

1,333,224.     Specification of Letters Patent.     Patented Mar. 9, 1920.

Application filed May 31, 1917. Serial No. 171,846.

*To all whom it may concern:*

Be it known that I, ELMER A. SPERRY, a citizen of the United States of America, residing at 1505 Albemarle road, Brooklyn, in the county of Kings and State of New York, have invented certain new and useful Improvements in Submarine Nets and Methods of Laying the Same, of which the following is a specification.

My invention relates to submarine nets, more particularly to the handling, *i. e.*, the transportation and placing, of said nets.

The principal object of my invention is to provide a novel method of winding a submarine net into a compact form without entangling it and whereby it may be unwound and paid out at the desired location with great facility.

Another object is to provide a novel form of apparatus for carrying out the above mentioned method.

A further object is to provide a novel form of net and clip therefor.

A further object is to provide a novel means for, and method of, anchoring a submarine net.

A still further object is to provide the anchor cable, or lines, with a plurality of electrical conductors adapted to be connected to any suitable or desirable signaling apparatus.

Other objects and advantages will appear as I proceed with the description of my invention. Referring to the drawings which illustrate what I now consider the preferred forms of my invention:

Figure 1 is a view showing one method and apparatus for paying out a submarine net.

Fig. 2 is a detail view showing my improved net and one form of float and anchoring means therefor.

Fig. 3 is a view illustrating one form of blank used in constructing my improved clip.

Fig. 3ª is a view similar to Fig. 3 but of a modification.

Fig. 4 illustrates my improved clip as applied to the intersecting strands of a net.

Fig. 5 is a plan view illustrating a different method of paying out a net.

Fig. 6 illustrates a modified way of securing the floats, anchor line and anchors.

Fig. 6ª is a view similar to Fig. 6 but of a slight modification.

Fig. 7 is a view similar to Fig. 6ª but illustrates a net of a plurality of sections.

Fig. 8 is a plan view illustrating one way of launching the net illustrated in Fig. 7.

Fig. 9 is an elevation showing one way of mounting the reels on a ship.

Fig. 10 is a detail view of one form of holder for a net reel.

Fig. 11 is a diagrammatic view showing a net partly diagonally stretched.

Fig. 12 is a view showing a plurality of separated nets, and

Fig. 13 is a cross-section of the anchor cable.

Bearing in mind that submarine nets as constructed are large in size, both in width and length and are of large mesh, the difficulty of handling such nets will be readily appreciated. By employing my improved apparatus and method, hereinafter disclosed, the transportation and launching of a large number of such nets is greatly facilitated without danger of entangling the latter.

One form of net structure which lends itself quite readily to the method of handling, hereinafter described, is shown in detail in Figs. 2 and 4. This net is shown made up of a plurality of intersecting light but strong strands 1, 2 secured together at the points of intersection by means of suitable clips 3. One form of clip which is effective, small and easy to manufacture is illustrated in Figs. 3ª and 4. This clip may be made of a substantially rectangular blank of sheet metal as shown in Fig. 3ª. This blank is slit or cut as indicated in the last mentioned figure thus forming four outer rectangles 4. The strands 1, 2 to be connected are then placed in the position indicated in dotted lines and the rectangles 4 crimped or rolled up around the strands in the form of sleeves, as indicated in Fig. 4, thus securely and firmly gripping the said strands. The slits in the blank may be slightly undercut as indicated at 5 in Fig. 3ª so that the rectangles 4 may be crimped up on both sides of the strands. Preferably the blanks are galvanized after the slitting or cutting operation but before being applied to the strands. A slightly different and simplified form of blank is shown in Fig. 3. The similarity between this form and that shown in Fig. 3ª will be apparent on inspection. In the form shown in Fig. 3, however, the slits are not undercut as at 5 in Fig. 3ª and the rectangles 4' are shown longer in proportion to the width than the rectangles 4 in Fig. 3ª.

Wherever the strands do not intersect but merely abut as indicated in dotted lines in Fig. 3 the rectangles 4 or 4' which would otherwise be idle may be brought down and crimped around the sleeve formed by the opposite rectangle. (See the upper clips in Fig. 2).

The clips 3 may be omitted at certain intervals along the top of the net and rings used instead. One of these rings is clearly indicated at 6 in Fig. 2. Similar rings 6' may be provided at the bottom of the net, (see Fig. 1). Each of the rings 6 along the top edge of the net may be provided with a wire link 8 secured at one end thereto and provided at the other end with a snap or clasp 7.

The buoys used in connection with the nets may assume the form illustrated in detail in Fig. 2. The float or buoy 9 is shown provided with a wire link 10 which link is secured at one end to the bottom of the buoy and carries at the other end a snap or clasp 11.

The anchoring means for the nets may assume the form illustrated in which a suitable weight or anchor 12 is secured to one end of, what I term, a depth line 13 the other of which is shown as provided with a snap or clasp 14.

In addition to the above described structure I prefer to provide a line 15 which may be termed an anchor line. This line may be provided with rings or other securing means 16, secured thereto at intervals corresponding to the intervals between the securing means or rings 6. The anchor line or cable 15 may be constructed as indicated in Fig. 13 which shows a number of electrical conductors 17 suitably insulated from each other and from the sheath 15'. The tensile strength of this cable 15 may be greatly increased by providing a steel or other cable 18 within the sheath and insulated from the conductors 17. The last mentioned elements may be utilized, if desired, to carry signaling current by being connected to suitable signaling apparatus.

The handling of the nets is greatly facilitated by employing reels or drums. One form of reel mechanism for use in connection with the nets *per se* is shown in the drawing, particularly in Figs. 9 and 10. The reels 20, of which any number may be utilized are adapted to be mounted in suitable supports for rotation about two axes, one of which axes is preferably horizontal. The supports, shown as two in number, may assume the form illustrated. Each of these supports is shown as comprising a platform 21 mounted for rotation about a stud 22 secured, preferably, in a horizontal position to a suitable support 23 on a ship or other carrier 24. Rollers 25 may be provided on the platform 21 between the latter and the support 23. A pair of brackets 26 may be connected to the platform 21 and journal openings 27 may be provided in the outer ends of these brackets. The reel supports are also provided with rods 28 adapted to extend through the openings 27. To prevent the rods from slipping out when they have been placed in the brackets they may each be provided at one end with a head 31 and at the opposite end with an opening 30 adapted to receive a cotter pin or other securing means 29. Each of the net carrying reels 20 is provided with an axially extending opening of such size as to allow the reel to rotate freely on the spindle or rod 28.

Preferably reels 32 are also provided for use in connection with the anchor cables or lines 15. The supports for these reels may be much simpler in structure than the net reel supports and may consist simply of a fixed base 33 provided with brackets 34. The last mentioned members may be provided at their outer ends with seats to receive the ends of rods or spindles 35 on which the reels 32 are adapted to rotate. The reels 32 may be located in any convenient position on the ship.

Assuming that the nets are on shore and it is desired to transport them to a certain location and launch them, the method of procedure may be as follows:

Each net, *per se*, i. e., stripped of buoys, anchors and anchor lines is stretched diagonally as indicated in Fig. 11. By stretching the nets N to a greater extent than is indicated in the last mentioned figure, they may be caused to assume an elongated form, small in cross-section, somewhat resembling a rope. Each of these nets N may then be wound on a reel or spool 20 and placed aboard a ship or other carrier. As the nets occupy but a small space when wound as above indicated a large number of them may be carried on a ship. A number of anchor lines or cables 15 are also each wound on a spool or drum 32 and placed aboard ship. The buoys, anchors and depth lines may be carried in any convenient location on the ship. The ship then proceeds to the desired location, i. e., to the place where the nets N are to be launched. One method of launching or paying out latter is indicated in Fig. 1 and may be briefly described as follows:

One of the wound reels 20 is mounted in its support by inserting a rod 28 through one of the brackets 26, then through the reel 20, then through the other bracket 26. The cotter pin or other locking means 29 may then be inserted in the opening 30 provided therefor.

A wound anchor cable reel 32 is also placed in its support 33. The net N and anchor line 15 may now be paid out by simply pulling on them. As the drum or reel 20 is rotatable about an axis, at right angles to its axis, it will be obvious that any tendency of the net to twist as it is being paid out will be neutralized. The net N and anchor cable 15 may now be connected by clipping or snapping each snap or clasp 7 into a corresponding ring 16. The buoys 9 and anchors 12 may be secured to the anchor cable and net by clipping the snaps 11 and 14 into corresponding rings 16, when the net is ready to be launched by dropping it over.

In Fig. 1 the net N completely equipped with floats or buoys and anchors is shown as being dropped over the side of the ship. When one reel 20 is completely unwound it may be replaced by another wound one and the above process repeated. Thus a number of nets N may be secured to a common anchor line 15 as indicated in Fig. 12. When the anchor cable spool or reel 32 is exhausted it may be replaced by a full one and the ends of the anchor cable may be connected if desired.

The buoys 9, anchors 12, and anchor cable 15 may be secured to the nets N in various ways in addition to that above described. Thus, as shown in Fig. 6 the anchor cable or line 15 may be secured to the net N by means of links 40 which links may be provided at each end with a snap or clasp similar to the snaps 7, 11 and 14, and adapted to be clipped into corresponding rings 6' and 16 on the net N and anchor line 15 respectively. The anchors 12 may be secured to the rings 16 in the same manner as above described in connection with Fig. 1. The buoys 9 are shown secured to the net N by clipping one of the snaps 7, 11 into the other.

A further modification in the manner of securing the nets N to the buoys, anchors and anchor lines is indicated in Fig. 6ª. This form is similar to that shown in Fig. 6 in that the floats or buoys 9 and the anchor line 15 are secured to the net N in the same manner. The links 40 are made long enough, however, to allow the cable 15 to rest or lie on the sea bottom so that lines 13 (see Fig. 6) are made very short, or omitted entirely, in which case anchors 12 are clipped directly to the rings 16.

It is to be understood of course that any one of the specific ways of securing the anchors, buoys, and anchor line to the net or nets, as described above may be utilized in connection with the method of handling hereinafter described in connection with Fig. 5.

The method of handling indicated in the last mentioned figure is practically the same as that described in connection with Fig. 1, except that the net is passed over the stern of the ship instead of over the side when launching it.

An elongated guide 41 may be provided on the deck of the ship and over which the net N is adapted to travel.

At certain times, i. e., in certain locations it is desirable to use two nets or two series of nets N one below the other as indicated in Fig. 7. In the last mentioned figure, upper net N is shown connected to the buoys 9 in the same manner as the net N in Fig. 6ª is secured to its buoys. The lower net N of Fig. 7 is shown as secured to anchors 12 and anchor line 15, in the same manner as the net N of Fig. 6ª is secured to the corresponding anchoring means. The upper and lower nets N may be secured to each other by clipping the snaps or clasps 7 of the wire links 8 of the lower net into the rings 6' of the upper net.

One method of paying out and launching the nets N shown in Fig. 7 is indicated in Fig. 8. In this method two nets, referred to as the upper and lower nets, and the anchor line 15 are paid out simultaneously, one net below the other as indicated. The two nets may be clipped together, the buoys and anchoring means attached as described in connection with Fig. 7, and the complete twosection net is ready for launching. Obviously a net of any number of sections could be launched in this manner by providing extra reel supports.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:

1. The method of handling a submarine net which comprises stretching the net diagonally to form a rope, then winding the rope so formed into a compact coil, and then paying out the net at the desired place by unwinding the coil.

2. The method of handling a submarine net which comprises stretching the net diagonally, winding the net so stretched into a compact coil, and paying out the net at the desired location by unwinding the coil.

3. The method of handling a multi-section net which consists in stretching each of the detached sections diagonally, winding each section so stretched into a coil, paying out the net at the desired location by simultaneously unwinding each coil, and securing the sections together edge to edge along their lengths.

4. The method of handling a submarine net which consists in stretching the net diagonally, winding the net so stretched into a compact coil, paying out the net at the desired location, simultaneously paying out an anchor rope and securing the anchor rope to the net prior to launching.

5. The method of handling a submarine net which consists in stretching the net diagonally, winding the net so stretched into a compact coil, paying out the net at the desired location, simultaneously paying out an anchor rope, securing the anchor rope to the net prior to launching, and securing anchors and buoys to said anchor line.

6. The method of handling a submarine net which comprises stretching the net diagonally to form a rope, then winding the rope so formed on a reel, and then paying out the net at the desired place by unwinding the net from the reel.

7. The method of handling a submarine net which comprises stretching the net diagonally, winding the net so stretched on a reel and paying out the net at the desired location by unwinding the net from the reel.

8. The method of handling a multi-section net which consists in stretching each of the detached sections diagonally, winding each section so stretched on a reel, paying out the net at the desired location by simultaneously unwinding each section from its reel, and securing the sections together edge to edge along their lengths.

9. The method of handling a submarine net which consists in stretching the net diagonally, winding the net so stretched on a reel, paying out the net at the desired location, simultaneously paying out an anchor rope and securing the anchor rope to the net prior to launching.

10. The method of handling a submarine net which consists in stretching the net diagonally, winding the net so stretched on a reel, paying out the net at the desired location, simultaneously paying out an anchor rope, securing the anchor rope to the net prior to launching, and securing anchors and buoys to said anchor line.

11. The method of handling a submarine net which comprises stretching the net diagonally to form a rope, then winding the rope so formed on a reel rotatable about two axes, and then paying out the net at the desired place by unwinding the net from the reel.

12. The method of handling a submarine net which comprises stretching the net diagonally, winding the net so stretched on a reel rotatable about two axes and paying out the net at the desired location by unwinding the net from the reel.

13. The method of handling a multi-section net which consists in stretching each of the detached sections diagonally, winding each section so stretched on a reel rotatable about two axes, paying out the net at the desired location by simultaneously unwinding each section from its reel and securing the sections together edge to edge along their lengths.

14. The method of handling a submarine net which consists in stretching the net diagonally, winding the net so stretched on a reel rotatable about two axes, paying out the net at the desired location, simultaneously paying out an anchor rope and securing the anchor rope to the net prior to launching.

15. The method of handling a submarine net which consists in stretching the net diagonally, winding the net so stretched on a reel rotatable about two axes, paying out the net at the desired location, simultaneously paying out an anchor rope, securing the anchor rope to the net prior to launching, and securing anchors and buoys to said anchor rope.

16. The method of handling a multi-section net which consists in stretching each of the detached sections diagonally, winding each section so stretched into a coil, paying out the net at the desired location by simultaneously unwinding each coil, and clipping the sections together edge to edge along their lengths.

17. The method of handling a submarine net which consists in stretching the net diagonally, winding the net so stretched into a compact coil, paying out the net at the desired location, simultaneously paying out an anchor rope and clipping the anchor rope to the net as the latter is being paid out.

18. The method of handling a submarine net which consists in stretching the net diagonally, winding the net so stretched into a compact coil, paying out the net at the desired location and clipping anchors and buoys to the net as it is being paid out.

19. In combination, a reel rotatable about two axes and a diagonally stretched submarine net wound on said reel.

20. In combination, a reel rotatable about two axes at right angles and a diagonally stretched submarine net wound on said reel.

21. In combination, a reel rotatable about two axes, one of which is horizontal and a diagonally stretched submarine net wound on said reel.

In testimony whereof I have affixed my signature.

ELMER A. SPERRY.